US009871982B2

(12) United States Patent
Yamashita

(10) Patent No.: US 9,871,982 B2
(45) Date of Patent: Jan. 16, 2018

(54) IMAGE PICKUP APPARATUS THAT DETECTS FLASH BAND AND CONTROL METHOD THEREFOR

(71) Applicant: CANON KABUSHIKI KAISHA, Tokyo (JP)

(72) Inventor: Yusuke Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/183,410

(22) Filed: Jun. 15, 2016

(65) Prior Publication Data

US 2016/0373671 A1 Dec. 22, 2016

(30) Foreign Application Priority Data

Jun. 17, 2015 (JP) ................................ 2015-121910

(51) Int. Cl.
*H04N 5/357* (2011.01)
*H04N 5/235* (2006.01)

(52) U.S. Cl.
CPC ......... *H04N 5/3572* (2013.01); *H04N 5/2354* (2013.01)

(58) Field of Classification Search
None
See application file for complete search history.

(56) References Cited

U.S. PATENT DOCUMENTS

2004/0183939 A1* 9/2004 Nonaka .............. H04N 5/23212 348/349
2012/0188403 A1* 7/2012 Gomita ................ H04N 5/2354 348/226.1
2015/0229818 A1* 8/2015 Fukuyama ......... G06K 9/00228 348/367

FOREIGN PATENT DOCUMENTS

JP 2010-135921 A 6/2010

* cited by examiner

*Primary Examiner* — James Hannett
(74) *Attorney, Agent, or Firm* — Cowan, Liebowitz & Latman, P.C.

(57) ABSTRACT

An image pickup apparatus which is capable of detecting a flash band with high accuracy even when no flash light is falling on a part of an image. The image pickup apparatus detects a band-shaped luminance step appearing in a plurality of frame images, which are obtained through image pickup by an image pickup unit, in a video comprised of the plurality of frame images. A detection area, which is for use in detecting the luminance step, is set in a part of the frame image according to a subject included in the frame image. Luminance data is obtained on a line-by-line basis in the detection area, and based on a difference in luminance data between corresponding lines in the frame images, the luminance step is detected.

7 Claims, 6 Drawing Sheets

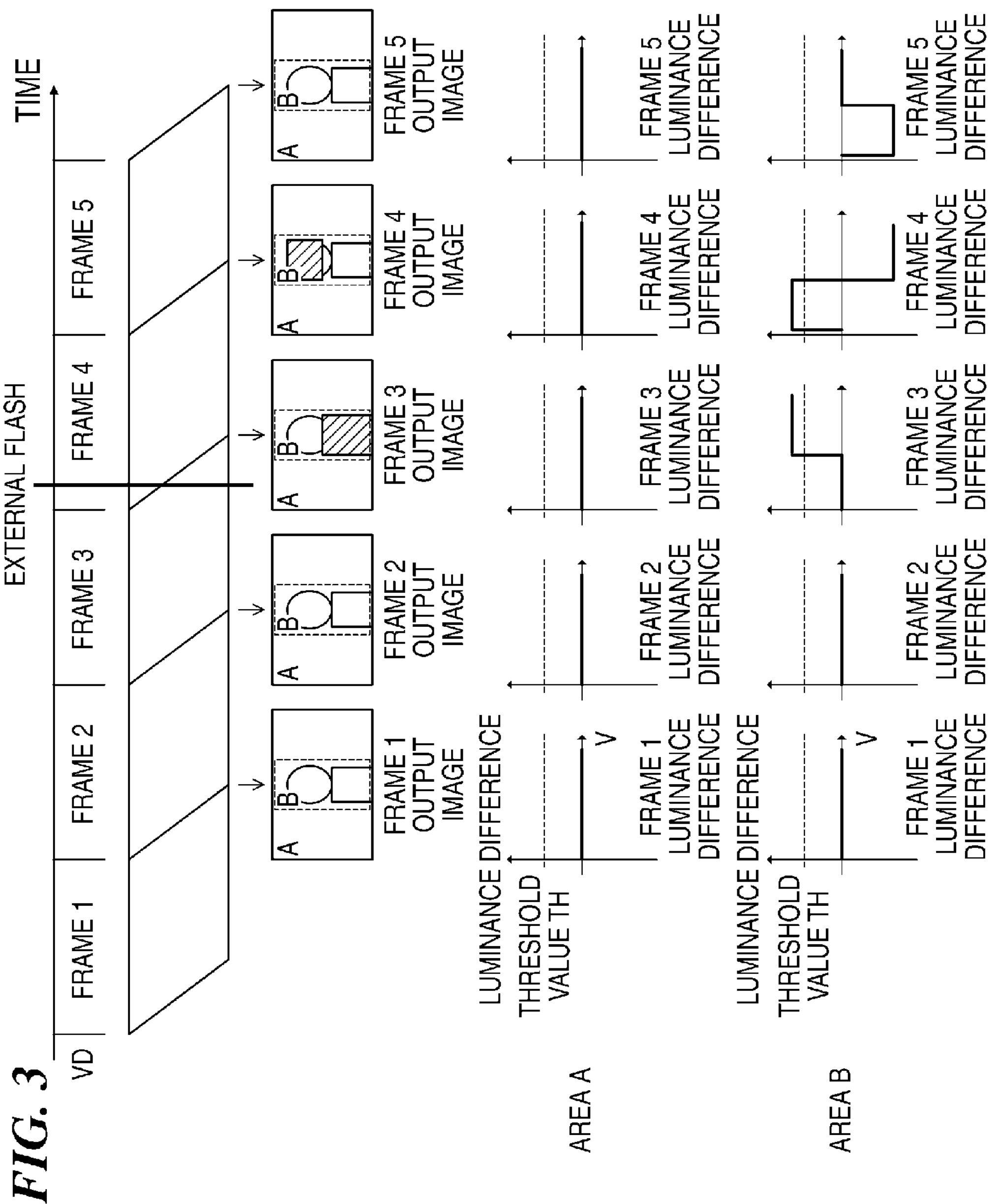
FIG. 3
TIME
VD
FRAME 1
FRAME 2
FRAME 3
FRAME 4
FRAME 5
EXTERNAL FLASH
A
B
FRAME 1 OUTPUT IMAGE
FRAME 2 OUTPUT IMAGE
FRAME 3 OUTPUT IMAGE
FRAME 4 OUTPUT IMAGE
FRAME 5 OUTPUT IMAGE
AREA A
LUMINANCE DIFFERENCE
THRESHOLD VALUE TH
V
FRAME 1 LUMINANCE DIFFERENCE
FRAME 2 LUMINANCE DIFFERENCE
FRAME 3 LUMINANCE DIFFERENCE
FRAME 4 LUMINANCE DIFFERENCE
FRAME 5 LUMINANCE DIFFERENCE
AREA B
LUMINANCE DIFFERENCE
THRESHOLD VALUE TH
V
FRAME 1 LUMINANCE DIFFERENCE
FRAME 2 LUMINANCE DIFFERENCE
FRAME 3 LUMINANCE DIFFERENCE
FRAME 4 LUMINANCE DIFFERENCE
FRAME 5 LUMINANCE DIFFERENCE

IMAGE PICKUP APPARATUS THAT DETECTS FLASH BAND AND CONTROL METHOD THEREFOR

BACKGROUND OF THE INVENTION

Field of the Invention

The present invention relates to an image pickup apparatus and a control method therefor, and in particular to an image pickup apparatus such as a digital single-lens reflex camera, a digital still camera, or a digital video camera.

Description of the Related Art

In an image pickup apparatus with an image pickup device such as a CMOS sensor, accumulation of electric charge is started with timings varying with lines of the image pickup device. Rolling shutter that reads out image signals on a line-by-line basis after lapse of a predetermined electric charge accumulation time period is used.

With the rolling shutter, the time at which an image signal is read out varies with lines. For this reason, when illumination is performed by emitting light for a very short time period such as firing of a flash or flashing of a strobe light, a phenomenon in which only a lower half of an image is bright, and an upper half of the image is dark may occur. Such a band-shaped brightness step appearing in an image is called a flash band.

There is a method by which, when a flash band is to be detected, luminance in a line direction in an image is calculated (see Japanese Laid-Open Patent Publication (Kokai) No. 2010-135921). When there is a band-shaped area where a luminance difference between frames is equal to or greater than a predetermined threshold value, it is judged that a flash band appears, and this flash band is corrected for.

According to the method described in Japanese Laid-Open Patent Publication (Kokai) No. 2010-135921, however, since an average luminance level in a line direction in an image is calculated, it is difficult to detect a flash band when, for example, no flash light is falling on only a part of an image.

For example, there is a case where there is a main subject distant to a background, and no flash light is falling on only the main subject on the front side. In this case, if an average luminance level in a line direction is detected, a flash band may not be detected due to a luminance difference between frames being small because there is a part on which no flash light is falling.

SUMMARY OF THE INVENTION

The present invention provides an image pickup apparatus and a control method therefor, which are capable of detecting a flash band with high accuracy even when no flash light is falling on a part of an image.

Accordingly, the present invention provides an image pickup apparatus that has an image pickup unit and detects a band-shaped luminance step appearing in a plurality of frame images, which are obtained through image pickup by the image pickup unit, in a video comprised of the plurality of frame images, comprising a setting unit configured to set a detection area, which is for use in detecting the luminance step, in a part of the frame image according to a subject included in the frame image, and a detecting unit configured to obtain luminance data on a line-by-line basis in the detection area, and based on a difference in luminance data between corresponding lines in the frame images, detects the luminance step.

According to the present invention, a luminance detection area is set in an image according to a subject area, and whether or not there is a band-shaped brightness step in the luminance detection area is judged. As a result, even when no flash light is falling on a part of the image, flash band is detected with high accuracy.

Further features of the present invention will become apparent from the following description of exemplary embodiments (with reference to the attached drawings).

BRIEF DESCRIPTION OF THE DRAWINGS

FIG. 3 is a diagram useful in explaining flash band detection that is performed in a video camera in FIG. 1.

DESCRIPTION OF THE EMBODIMENTS

Hereafter, a description will be given of exemplary image pickup apparatuses according to embodiments of the present invention with reference to the drawings.

Figure 1:
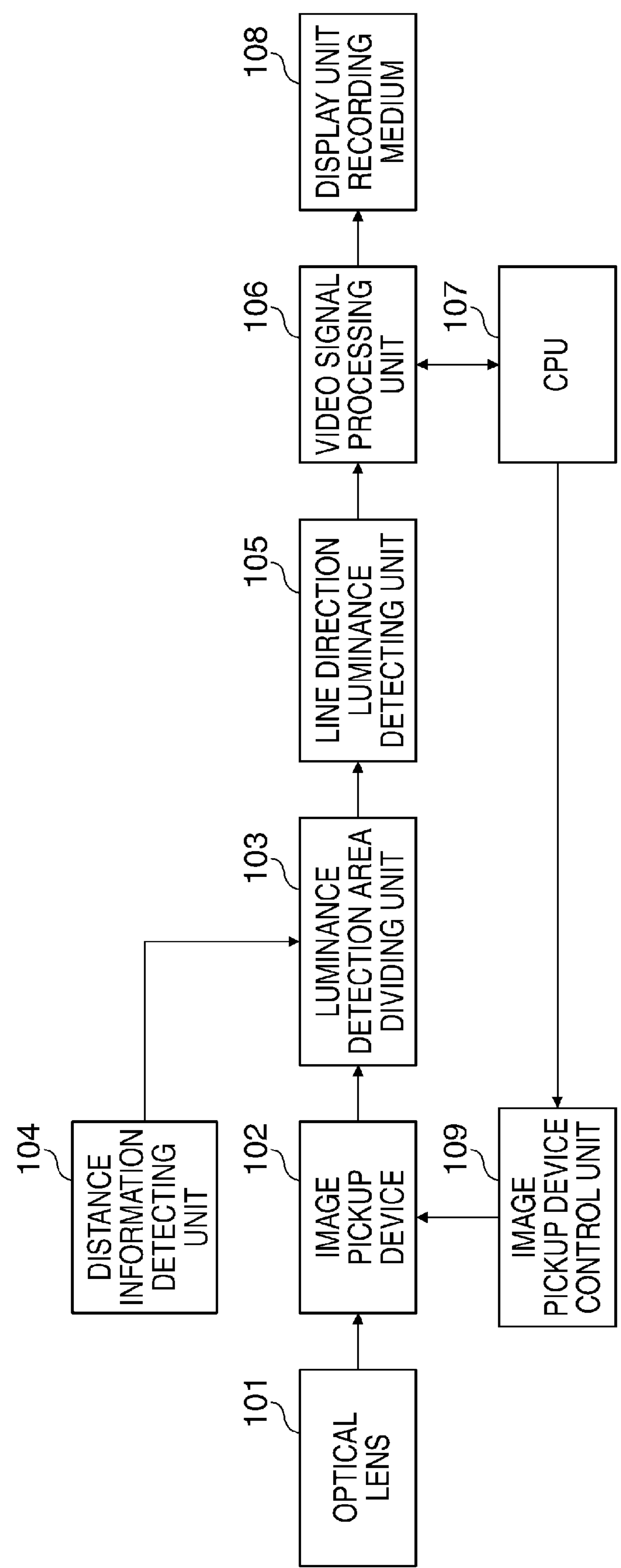
FIG. 1 is a block diagram schematically showing an arrangement of an exemplary image pickup apparatus according to a first embodiment of the present invention.

FIG. 1 is a block diagram schematically showing an arrangement of an exemplary image pickup apparatus according to a first embodiment of the present invention.

The image pickup apparatus shown in the figure is, for example, a digital camera (hereafter referred to merely as a video camera) and has an optical lens unit (hereafter referred to merely as an optical lens) 101. The optical lens 101 has a focusing mechanism for obtaining focus, a diaphragm mechanism for adjusting the amount of light and the depth of field, and a zooming mechanism for changing the focal length, although they are not shown in the figure.

Incident light (optical image) through the optical lens 101 forms an image on an image pickup device 102 such as a CMOS sensor. The image pickup device 102 then outputs a digital video signal (hereafter referred to merely as a video signal) corresponding to the optical image. This video signal is input to a luminance detection area dividing unit 103.

A distance information detecting unit 104 detects a distance between a subject and the video camera using, for example, an infrared light source and an infrared sensor and sends information on the distance to the luminance detection area dividing unit 103. Based on the information on the distance, the luminance detection area dividing unit 103 divides an image (one frame) represented by a video signal into a plurality of luminance detection areas (namely, flash band detection areas). It should be noted that a distance between a subject and the video camera should not always be detected using infrared radiation, but the luminance detection area dividing unit 103 may calculate information on the distance based on focus lens positional information on the optical lens 101 or a video signal without using the distance information detecting unit 104.

A line direction luminance detecting unit 105 detects luminance in a line direction with respect to each of the luminance detection areas to obtain luminance data. Based on luminance data output from the line direction luminance detecting unit 105, a video signal processing unit 106 judges whether or not a band-shaped brightness step (flash band) appears with respect to each of the luminance detection areas under the control of a CPU 107.

The video signal processing unit 106 not only judges whether or not a flash band appears but also subjects a video signal to a developing process or the like as well as a predetermined correction process to generate image data. The image data output from the video signal processing unit 106 is output to a display unit recording medium 108. Then, an image corresponding to the image data is displayed on a display unit, and the image data is recorded in the recording medium.

The CPU 107 is responsible for controlling the overall video camera. An image pickup device control unit 109 controls shutter speed, gain, and frame rate of the image pickup device 102 under the control of the CPU 107.

Figure 2:
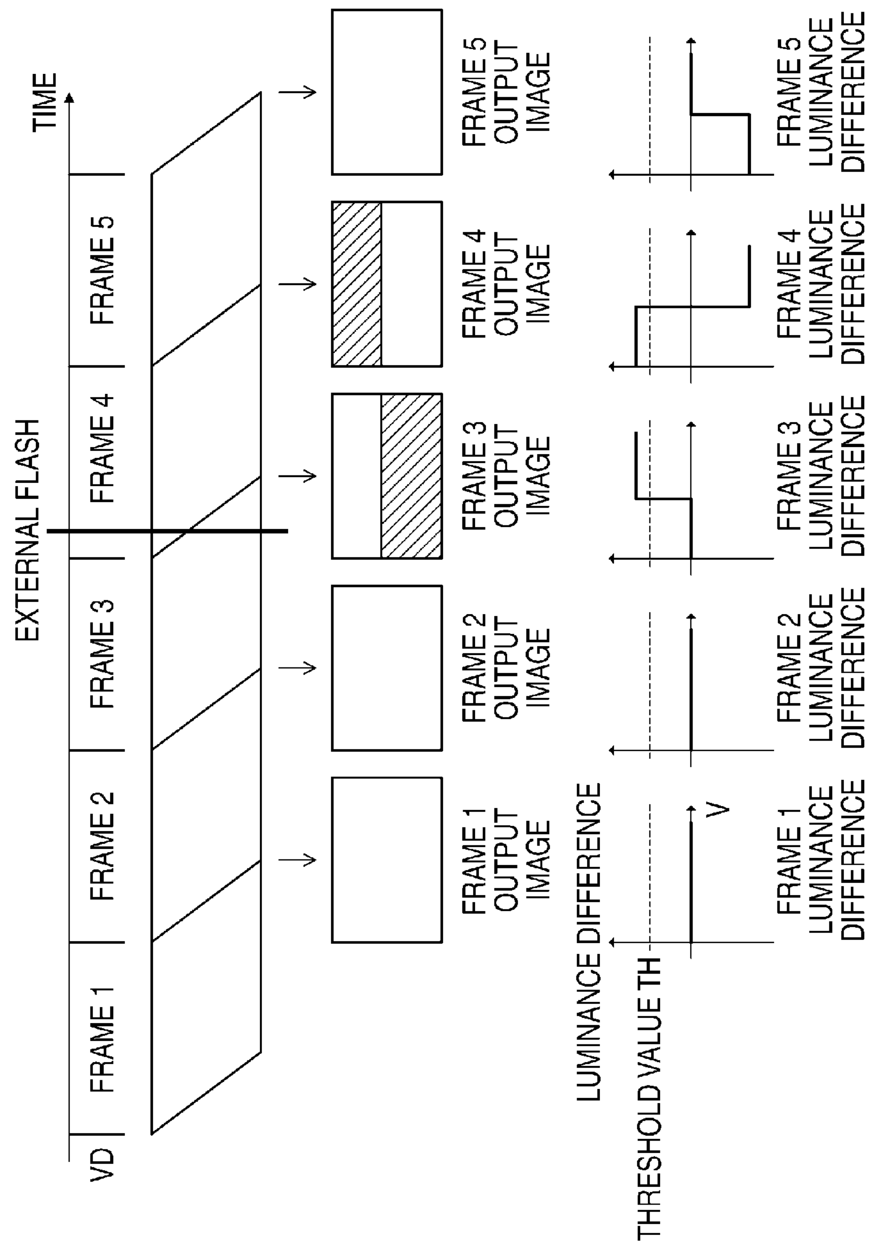
FIG. 2 is a diagram useful in explaining an example of conventional flash band detection.

FIG. 2 is a diagram useful in explaining an example of conventional flash band detection.

Referring to FIG. 2, it is assumed that video signals of a frame 1 through a frame 5 are successively read our from an image pickup apparatus in response to a vertical synchronization signal (VD). In the example shown in the figure, it is assumed that an external flash is generated during a time period for which electric charge is accumulated for frames 3 and 4. Further, this external flash causes a flash band (indicated by a shaded area) to appear in a lower part of an image in the frame 3 (output image) and causes a flash band to appear in an upper part of an image in the frame 4 (output image).

When a flash band is to be detected, an average luminance value in a line direction is calculated for each of two consecutive frames. A difference in average luminance values between the two consecutive frames is obtained as a luminance difference, and when the number of consecutive lines in which this luminance difference is greater than a predetermined threshold value Th reaches a number (for example, 10) determined in advance, it is judged that a flash band appears.

In the example shown in FIG. 2, in the frame 3 and the frame 4, the number of consecutive lines in which the luminance difference becomes greater than the threshold value Th reaches the number determined in advance, and it is judged that a flash band appears in the frame 3 and the frame 4.

According to the flash band detection method described above with reference to FIG. 2, an average luminance value in a line direction is calculated with an area where no flash band appears taken into account. For this reason, when a flash band appears only in a part of an image, an average luminance value in a line direction may be low. As a result, the number of consecutive lines in which a luminance difference is greater than the threshold value Th may not reach the number determined in advance, and appearance of a flash band may not be detected.

FIG. 3 is a diagram useful in explaining flash band detection that is performed in the video camera according to the present embodiment.

Referring to FIG. 3, it is assumed that video signals of a frame 1 through a frame 5 are successively read out from the image pickup device 102 in response to a vertical synchronization signal (VD). In the example shown in the figure, it is assumed that an external flash (for example, firing of a flash) is generated during a time period for which electric charge is accumulated for frames 3 and 4. Further, this external flash causes a flash band (indicated by a shaded area) to appear in a part (body part) of a subject in the frame 3 (output image) and causes a flash band to appear in a part (face part) of the subject in the frame 4 (output image).

As described earlier, when a flash band is to be detected, the luminance detection area dividing unit 103 divides an image into a plurality of luminance detection areas according to distance information. In the example shown in the figure, a background area is designated as a luminance detection area A, and a subject area is designated as a luminance detection area B. The line direction luminance detecting unit 105 detects luminance in a line direction with respect to each of the luminance detection area A and the luminance detection area B to obtain luminance data (average luminance level).

It should be noted that although in the description of the present embodiment, it is assumed that data indicative of an average luminance level in a line direction is obtained as luminance data, the type of the luminance data is not limited as long as it is data that enables calculation of a luminance difference between two consecutive frames. For example, data indicative of a luminance integral value in a line direction may be luminance data.

The video signal processing unit 106 calculates a luminance difference between two consecutive frames based on the luminance data. When in either of the luminance detection area A and the luminance detection area B, the number of consecutive lines in which a luminance difference is greater than the threshold value Th reaches a number (for example, 10) determined in advance, the video signal processing unit 106 judges that a flash band appears.

Although in the example shown in FIG. 3, in the luminance detection area A of all the frames 1 to 5, a luminance difference is not greater than the threshold value Th, but as for the luminance detection areas B, the number of consecutive lines in which a luminance difference is greater than the threshold value Th reaches the number determined in advance in the frames 3 and 4. Thus, the video signal processing unit 106 judges that a flash band appears in the frames 3 and 4.

As described above, an image is divided into a plurality of luminance detection areas, and hence even when a flash band appears only in a part of an image, an average luminance value in a line direction is unlikely to be small in the luminance detection areas. As a result, even when a flash band appears only in a part of an image, the number of consecutive lines in which a luminance difference is greater than the threshold value Th reaches the number determined in advance, and hence appearance of a flash band is detected with high accuracy.

Figure 4:
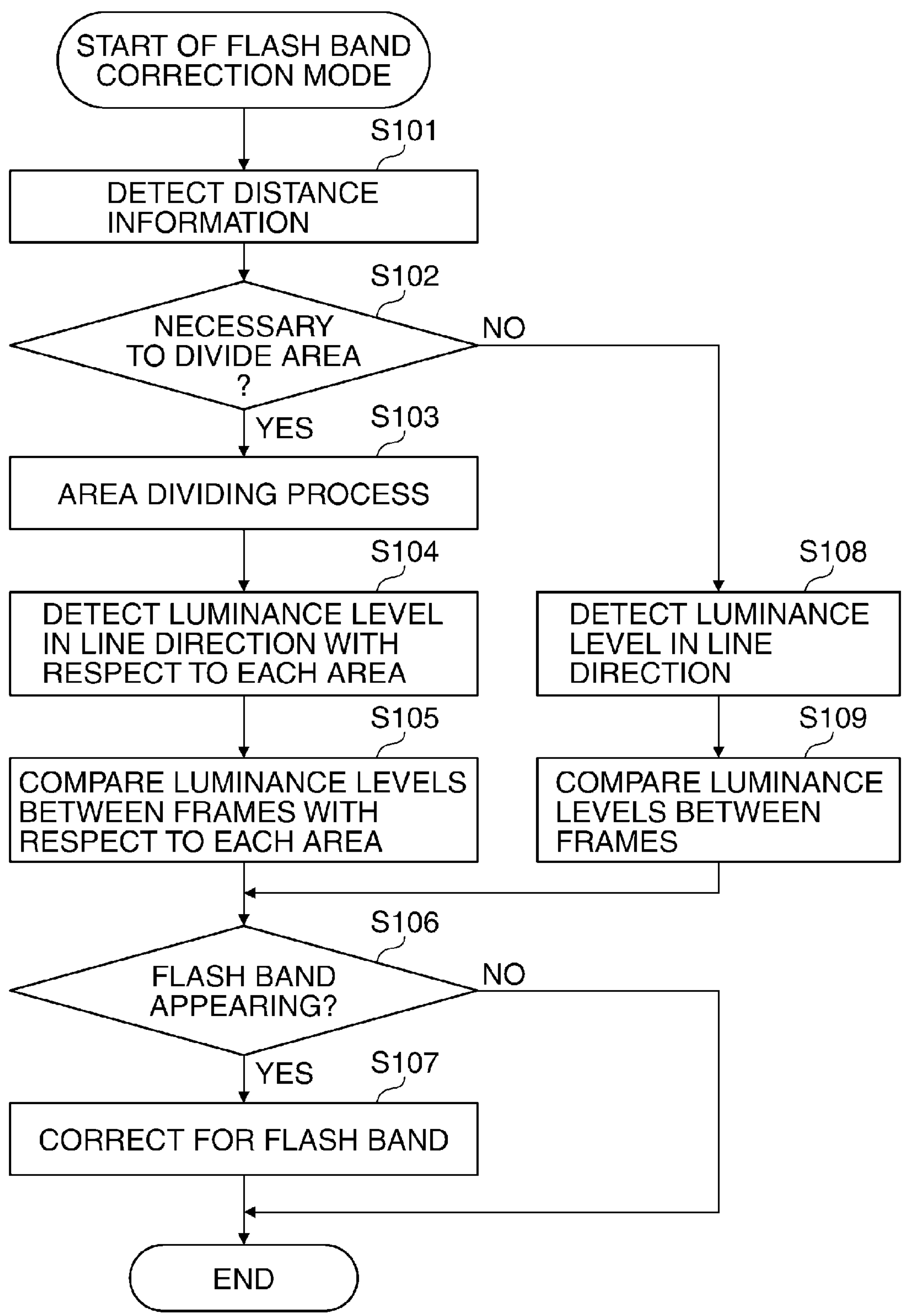
FIG. 4 is a flowchart useful in explaining an exemplary flash band correction mode that is run in the video camera in FIG. 1.

FIG. 4 is a flowchart useful in explaining an exemplary flash band correction mode that is run in the video camera in FIG. 1. It should be noted that processes in FIG. 4 are carried out under the control of the CPU 107.

When the flash band correction mode is started, the distance information detecting unit 104 detects distance information indicative of a distance from a subject to the video camera (step S101). It should be noted that the subject here includes not only a main subject area such as a person but also a background area with the field of view. The luminance detection area detecting unit 103 judges whether or not it is necessary to divide an image into a plurality of luminance detection areas according to the distance information (step S102). Here, when, for example, there is a subject area and other areas in the image, the luminance detection area detecting unit 103 divides the image into a plurality of luminance detection areas according to the distance information.

Upon judging that it is necessary to divide the image into a plurality of luminance detection areas (YES in the step S102), the luminance detection area detecting unit 103 carries out an area dividing process in which it divides the image into a plurality of luminance detection areas according to the distance information (step S103).

The line direction luminance detecting unit 105 then detects luminance in a line direction with respect to each of the luminance detection areas to obtain an average luminance value (hereafter also referred to as an average luminance level) (step S104). The video signal processing unit 106 compares average luminance levels between corresponding luminance detection areas in two consecutive frames to obtain a luminance difference (step S105).

The video signal processing unit 106 judges whether or not a flash band appears according to the luminance difference (step S106). Namely, the video signal processing unit 106 judges whether or not the number of consecutive lines in which the luminance difference is greater than the threshold value Th reaches a flash band appears (YES in the step S106), the video signal processing unit 106 performs flash band correction using a known method (step S107). Here, the video signal processing unit 106 performs flash band correction using a frame, which is located immediately before a frame in which a flash band appears, instead of the frame in which the flash band appears. After that, the CPU 107 exits the flash band correction mode.

On the other hand, upon judging that it is unnecessary to divide the image into a plurality of luminance detection areas according to the distance information (NO in the step S102), the luminance detection area detecting unit 103 does not carries out the area dividing process. The line direction luminance detecting unit 105 then detects luminance in a line direction in the image to obtain an average luminance level (step S108). After that, the video signal processing unit 106 compares luminance levels between two consecutive frames to obtain a luminance difference (step S109), followed by the process proceeding to the step S106 described above.

As described above, in the first embodiment of the present invention, when a flash band is to be detected in an image, the image is divided into a plurality of luminance detection areas according to distance information. Appearance of a flash band is then detected with respect to each of the luminance detection areas, and this improves the accuracy of flash band detection.

A description will now be given of a video camera according to a second embodiment of the present invention.

In the first embodiment described above, an image is divided into a plurality of luminance detection areas according to distance information, and appearance of a flash band is then detected with respect to each of the luminance detection areas. In this case, when a luminance detection area is narrow in a background area or the like, false detection may occur. Thus, in the second embodiment, a subject is detected in an image, and a luminance detection area which is a flash band detection area is set around the subject.

Figure 5:
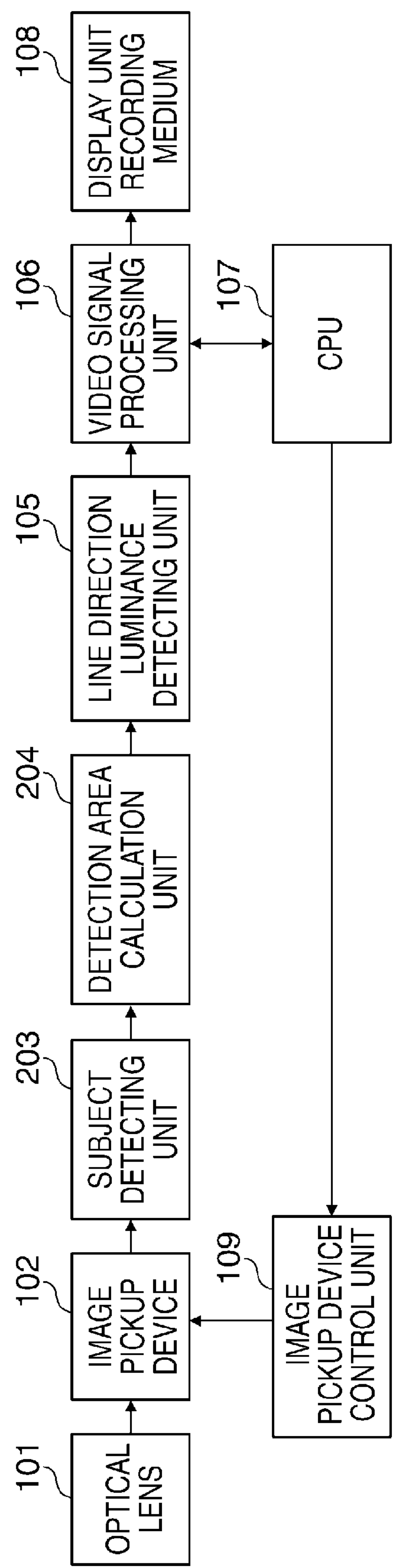
FIG. 5 is a block diagram schematically showing an arrangement of an exemplary image pickup apparatus according to a second embodiment of the present invention.

FIG. 5 is a block diagram schematically showing an arrangement of an example of the video camera according to the second embodiment of the present invention. It should be noted that the same component elements as those of the video camera in FIG. 1 are designated by the same reference numerals, and description thereof is omitted.

The video camera shown in the figure has a subject detecting unit 203 and a detection area calculation unit 204 instead of the luminance detection area dividing unit 103 and the distance information detecting unit 104 described above with reference to FIG. 1.

A video signal which is an output from an image pickup device is supplied to the subject detecting unit 203. The subject detecting unit 203 detects a subject area in a video signal such as a face area and a human body area on a frame-by-frame basis. A subject area such a face area or a human body area should be detected using a known method (for example, pattern matching), and detailed description thereof is omitted. The subject detecting unit 203 sends a subject detection result to the detection area calculation unit 204. It should be noted that the video signal is supplied to the face detection calculation unit 204 via the subject detecting unit 203, and the subject detection result includes a size of a subject and a position of the subject on an image.

Based on the subject detection result, the detection area calculation unit 204 sets an area of a predetermined range (the subject and its vicinity) including a subject area as a luminance detection area (that is, a flash band detection area). The detection area calculation unit 204 sends the set luminance detection area as well as the video signal to the line direction luminance detecting unit 105.

Figure 6:
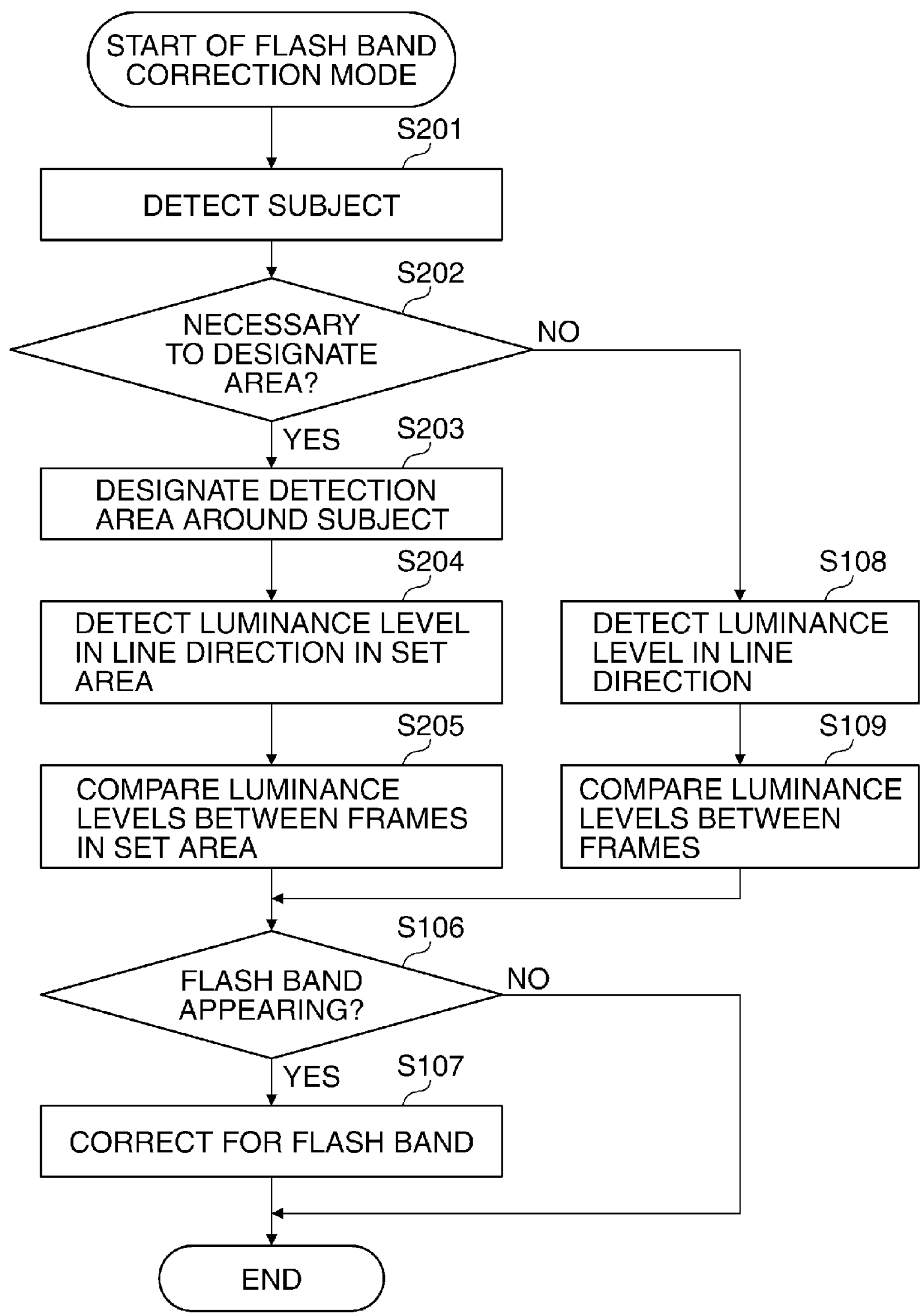
FIG. 6 is a flowchart useful in explaining an exemplary flash band correction process that is carried out in a video camera in FIG. 5.

FIG. 6 is a flowchart useful in explaining an exemplary flash band correction process that is carried out in the video camera in FIG. 5.

It should be noted that in the flowchart of FIG. 6, the same steps as those in the flowchart of FIG. 4 are designated by the same reference numerals, and description thereof is omitted. Also, processes in the figure are carried out under the control of the CPU 107.

When the flash band correction mode is started, the subject detecting unit 203 detects a subject area on a frame-by-frame basis in a video signal which is an output from the image pickup device 102 (step S201). The subject detecting unit 203 then sends a subject detection result to the detection area calculation unit 204. Based on the subject detection result, the detection area calculation unit 204 judges whether or not it is necessary to set (designate) a luminance detection area (step S202). Here, when the subject detection result includes a detected subject area, the detection area calculation unit 204 judges that it is necessary to designate a luminance detection area.

When the detection area calculation unit 204 judges that it is unnecessary to designate a luminance detection area (NO in the step S202), the line direction luminance detecting unit 105 detects an average luminance level in a line direction for the entire image of one frame in the step S108.

On the other hand, upon judging that it is necessary to designate a luminance detection area (YES in the step S202), the detection area calculation unit 204 sets an area of a predetermined range including the subject area as a luminance detection area based on the subject detection result (step S203). The line direction luminance detecting unit 105 then detects a luminance in a line direction in the set luminance detection area to obtain a luminance level (step S204).

Then, the video signal processing unit 106 compares luminance levels between corresponding luminance detection areas in two consecutive frames to obtain a luminance difference (step S205). After that, the process proceeds to the step S106 described above with reference to FIG. 4.

As described above, in the second embodiment of the present invention, when a flash band is to be detected in an image, an area of a determined range including a subject area detected in the image is designated as a luminance detection area, that is, a flash band detection area. Appearance of a flash band is then detected in the luminance detection area, and this prevents false detection and improves the accuracy of flash band detection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121910, filed Jun. 17, 2015, which is hereby incorporated by reference herein in its entirety.

What is claimed is:

1. An image pickup apparatus that has an image pickup unit and detects a band-shaped luminance step appearing in a plurality of frame images, which are obtained through image pickup by the image pickup unit, in a video comprised of the plurality of frame images, comprising:

a setting unit configured to set a detection area, which is for use in detecting the luminance step, in a part of the frame image according to a subject included in the frame image, wherein said setting unit obtains a subject area based on distance information indicative of a distance between the image pickup apparatus and the subject and sets the detection area according to the subject area; and a detecting unit configured to obtain luminance data on a line-by-line basis in the detection area, and based on a difference in luminance data between corresponding lines in the frame images, detects the luminance step.

2. The image pickup apparatus according to claim 1, further comprising a subject detecting unit configured to detect a subject included in the frame image, wherein said setting unit sets the detection area such that the detection area includes the subject detected by said subject detecting unit.

3. The image pickup apparatus according to claim 1, wherein said detecting unit judges that there is the luminance step in the detection area when the number of line in which a difference in luminance data between two consecutive frame images is equal to or greater than the number of consecutive lines set in advance.

4. The image pickup apparatus according to claim 1, wherein the luminance data is data indicative of an average luminance level in a line direction in the detection area.

5. The image pickup apparatus according to claim 1, wherein the luminance data is data indicative of a luminance integral value in a line direction in the detection area.

6. The image pickup apparatus according to claim 1, further comprising a correction unit configured to correct for the luminance step detected by said detecting unit.

7. A control method for an image pickup apparatus that has an image pickup unit and detects a band-shaped luminance step appearing in a plurality of frame images, which are obtained by image pickup using the image pickup unit, in a video comprised of the plurality of frame images, comprising:

a setting step of setting a detection area, which is for use in detecting the luminance step, in a part of the frame image according to a subject included in the frame image, wherein in said setting unit, a subject area based on distance information indicative of a distance between the image pickup apparatus and the subject is obtained and the detection area according to the subject area is set; and a detecting step of obtaining luminance data on a line-by-line basis in the detection area, and based on a difference in luminance data between corresponding lines in the frame images, detecting the luminance step.

* * * * *